2 Sheets—Sheet 1.

C. J. CARR.
HORSESHOE.

No. 176,834.

Patented May 2, 1876.

Witnesses.
J. H. Shumway
C. V. Forbes

Chas. J. Carr
Inventor
By atty.
John E. Earle

2 Sheets—Sheet 2.

C. J. CARR.
HORSESHOE.

No. 176,834.

Patented May 2, 1876.

Witnesses.
J. H. Shumway
C. C. Forbes

Chas. J. Carr
Inventor
By Atty.
John S. Earle

UNITED STATES PATENT OFFICE.

CHARLES JOHN CARR, OF MANCHESTER, ENGLAND.

IMPROVEMENT IN HORSESHOES.

Specification forming part of Letters Patent No. 176,834, dated May 2, 1876; application filed May 2, 1874.

*To all whom it may concern:*

Be it known that I, CHARLES JOHN CARR, of Manchester, in the Kingdom of Great Britain, engineer, have invented new and useful Improvements in Shoes for Horses and other animals; and I do hereby declare that the following is a full and exact description thereof, reference being had to the accompanying two sheets of drawings, and to the letters of reference marked thereon.

This invention consists in a horseshoe as constructed with an inner and an outer flange upon its upper surface to partially secure the shoe, and straps connected with the shoe and extending over the hoof, as more fully hereinafter described.

Figure 1:
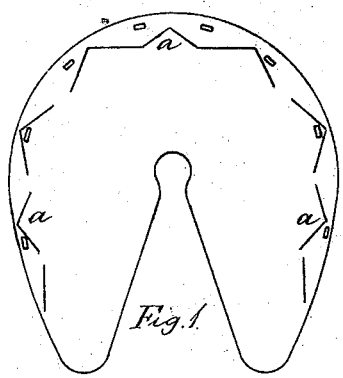
Figure 2:
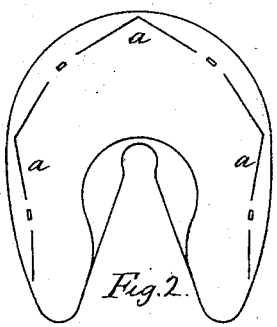
Figure 3:
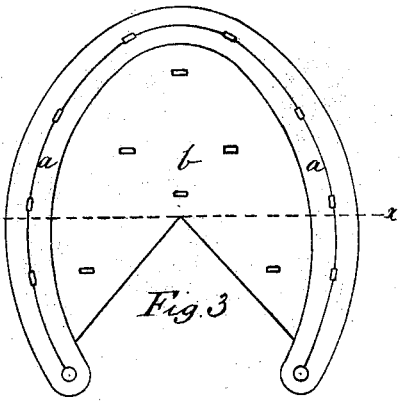
Figure 4:
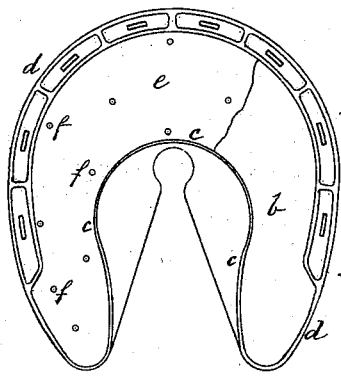
Figure 3A:
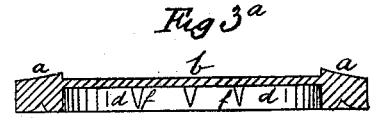

Figures 1, 2, and 3 represent the foot-surface of shoes of various shapes; Figs. 4, 5, 6, 7, and 8, the road-surface. Figs. $3^a$ and $5^a$ are sections at the lines $x\ x$, Figs. 3 and 5, respectively; and Figs. 10, 11, 12, and 13 show the means, in conjunction with my improvements on the foot-surface, of securing the shoe to the hoof with or without nails, or by fasteners combined with nails, and in all the figures similar letters refer to similar parts.

My improvement, connected with the upper or foot surface of the shoe, consists in a bead or ridge, $a$, Figs. 1, 2, and 3, of any convenient form or direction—by preference angular—and rising from the face of the shoe one-eighth of an inch, more or less, and extending round or partially round the circumference of the shoe, the greatest distance from its outer edge being about half an inch. The projecting ridge may also be round the outer circumference of the shoe, beyond the nail-holes, so that when this projecting bead or ridge is burnt onto or otherwise properly let into the horse's hoof there shall be no tendency of the shoe to slide on the foot when traveling on the road; or small spikes can be cast or secured on the foot-surface of the rim of the shoe, and placed diagonally or otherwise, so that they will enter the "crust" upon shoeing the horse, thus rendering clips unnecessary, and greatly diminishing the number of nails required, and when the shoe is burnt to the foot the same number of shoe without the pad is used, and the shoe with the pad is afterward applied and secured. But I prefer cold-fitting, in which case adhesive substances or mixtures may be used between the shoe and the crust of the hoof to insure more solid fitting, or a bevel may be formed on the shoe, beyond the nail-holes, inclining upward toward the sole of the foot, (see Fig. $3^a$,) or this bevel may commence from the extreme outer edge of the shoe, the hoof being fitted to the same, or the horn of the hoof could be hollowed out to receive a corresponding projection on the shoe, or vice versa, or cells or hollows may be formed at certain distances around the shoe, these arrangements preventing the shoes sliding on the foot; and shoes thus formed can be made of malleable cast-iron, wrought-iron, or other suitable material, whether fastened to the hoof by ordinary horse-nails, or by any other means.

Figure 5:
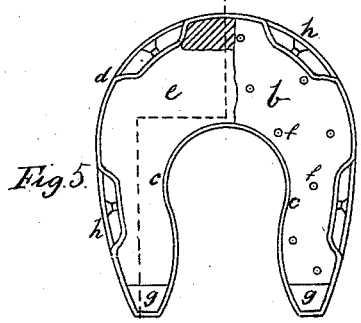
Figure 5A:
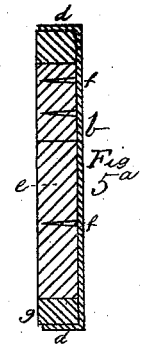
Figure 6:
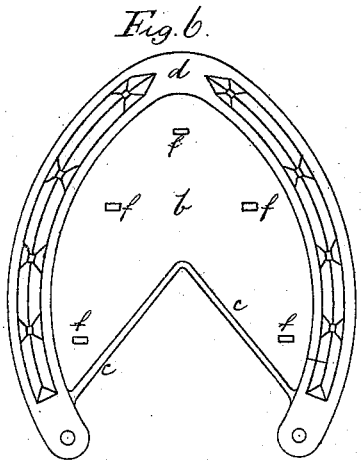

In the various figures, $b$ represents the shield, which covers, or nearly covers, the sole, with the exception of the frog, it being varied in extent and form to meet circumstances and the structure of the hoof; but when a bar-shoe is used the shield may also cover the frog. In the direction of the opening in the sole plate or shield, or at any required distance therefrom, a thin upright flange, $c$, is raised, corresponding, or nearly so, with the height of the external rim $d$ of the shoe. This flange may be $\wedge$-shaped, or of any other suitable form, and extends around the space for the frog from heel to heel of the shoe, or nearly so. The cavity formed by the thin shield $b$, flange $c$, and external rim $d$ is adapted for the reception of pads $e$ of greatly compressed tarred rope, compressed layers of cloth, or other fabrics or substances made water-proof, and, by preference, secured by being pressed or driven onto small spikes $f$, cast to and projecting from the lower surface of the shield; or the pads may be held by adhesive mixtures or other convenient means. The pads are made to fill the cavity between the inside of the external rim $d$ and flange $c$, and may be combined with toe-pieces, heel-pieces, or side pieces $g$, (see Figs. 5 and $5^a$,) of hard anti-wearing substance, in which case the shoe would last longer; or the casting may be made thicker at these parts. The external rims $d$ of these shoes are, by preference, made in a series of corrugations or angles, with nail-holes $h$ in the recesses, as shown at Figs. 5 and 7; or the rims may be formed as in Fig. 4, or may be like the hand-made fullered or stamped shoe shown at Fig. 6.

Figures 7, 8:
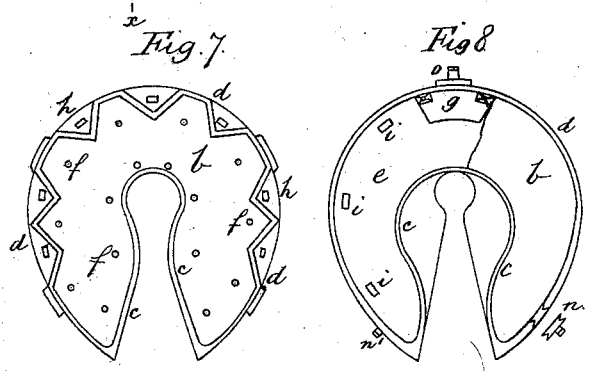

In Fig. 8 the pad is shown to cover the nail-holes, so that the nails $i$ will pass through the pad, and find their seats in holes formed on the shield, thus giving an increase of pad-surface.

Any of these shoes with shields may be used without pads; or the shields may be dispensed with, leaving simply the outer rim carrying the nail-holes, combined with my improvement for preventing the shoe sliding on the foot.

Figure 9:
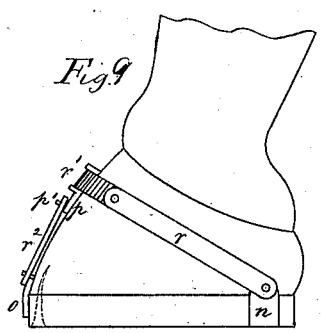
Figure 10:
Figure 11:
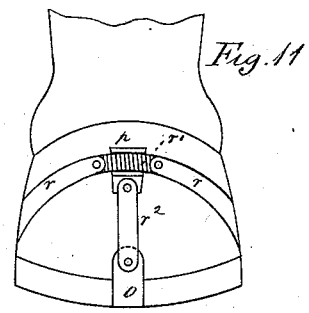
Figure 12:
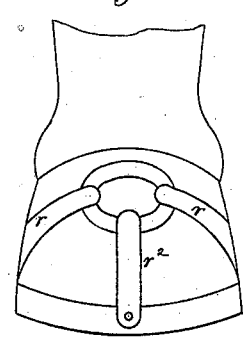

Studs or clips are cast on, or slots are formed in, the outer rim of the shoe. One of these clips, carrying a stud or button, is shown at $n$, Figs. 8 and 10, near the heel of the shoe, and at the other side, as a variation, is a stud, $n'$, projecting from the rim. At the toe is another clip, $o$, carrying a stud, and on the front of the hoof a plate, $p$, is fastened, carrying a stud, $p'$, Figs. 9 and 10, in line vertical with that at the toe of the shoe. The plate $p$ is furnished with a groove or recess, $q$, and is let into the hoof to a sufficient depth to secure it without hurting the foot—say, for about one-sixteenth of an inch deep—and can be secured by small spikes cast on its under side; but as the hoof grows downward this plate will, in time, require to be moved, or it can be secured to the hoof by screws without being let in.

In shoeing the horse, the shoe (having ridges on the upper side, as before described) is burnt on or otherwise fitted to the foot. A thin metal or other strap or band, $r$, formed of two pieces, and joined by a metal spring, $r^1$, (or an elastic substance forming a spring,) is then hooked or otherwise fastened onto one of the studs or slots, as the case may be, at or near the heel of the shoe, and then passed over or through the recess or groove formed in the fixed plate $p$, the said groove serving to keep the band in position; or an india-rubber band may be used in lieu of the strap $r$, formed with springs, as described. As a modification of this arrangement, a spring may be fixed upon plate $p$, in the groove $q$, and bands or straps fastened thereto, and secured to pins or slots at the heel of the shoe, or instead of the described arrangements of springs in connection with straps $r$ a bow-spring may be employed to give the required tension. The bow-spring will work in the groove $q$, and the metal or other band, of about the length of the distance from heel to heel, is passed over the bow-spring, and is put in tension thereby.

Figure 13:
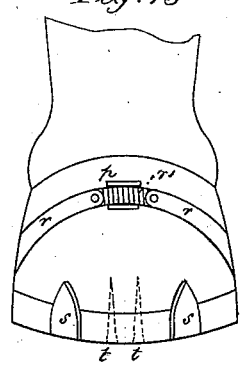

When the bow-spring is not employed the strap is made shorter than the distance round the foot from stud to stud at the heel, and the spring, attached to the strap or in connection therewith, will give the required tension for holding the shoe to the foot at the heel. An elastic strap, $r^2$, Figs. 9, 11, and 12, of any convenient form for giving the required degree of tension, is fastened on the stud $p'$ at the lower end of the fixed plate $p$, extending to and fastened on the stud carried by the toe-clip $o$, and although I have shown the shoe fastened to the hoof at three points only, any required number of straps attached from the shoe to the plate $p$ or to the heel-strap $r$ might be used; or, instead of the fixed plate in front of the hoof, the straps may be fastened to a loose elastic ring, which will act as a spring. (See Fig. 12.) The front strap $r^2$ may, however, be dispensed with, and the front of the shoe be secured to the toe of the hoof by one or more nails at or round the toe, and used together with the heel-strap $r$. An arrangement of this description is shown in Fig. 13, in which are two clips, $s$, and two nails, $t$, one on each side of the toe, the clips being preferred to be cast on the shoe and placed outside the nail-holes. Although my improvements are shown as applied to shoes for horses and other animals with similar hoofs, such as mules, it will be readily understood that they can be adapted to shoes for other animals, such as oxen, but in this case the shoes would be made in halves.

I do not broadly claim constructing horseshoes with upward projection as an aid to securing the shoe; as such I am aware is not new—as, for instance, the patent of B. Ladd, No. 81,796.

Having thus described the nature and particulars of my said invention, and illustrated the same on the accompanying two sheets of drawings, I claim—

As an article of manufacture, the herein-described horseshoe, as constructed with the inner flange $c$, and the outer flange $d$ extending around and up on the outer surface of the hoof, the straps $r$ $r$ and $r^2$, and the projections $a$ on the upper surface, substantially as described.

Done at London, England, this eighteenth day of December, one thousand eight hundred and seventy-three.

CHARLES JOHN CARR.

Witnesses:
 E. J. HUGHES,
  123 *Chancery Lane, London.*
 W. A. BARLOW,
  123 *Chancery Lane, London.*